(12) United States Patent
Xiong

(10) Patent No.: US 9,823,506 B2
(45) Date of Patent: Nov. 21, 2017

(54) LIQUID CRYSTAL PANEL AND LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventor: Yuan Xiong, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 124 days.

(21) Appl. No.: 14/906,714

(22) PCT Filed: Dec. 30, 2015

(86) PCT No.: PCT/CN2015/099712
§ 371 (c)(1),
(2) Date: Jan. 21, 2016

(87) PCT Pub. No.: WO2017/075887
PCT Pub. Date: May 11, 2017

(65) Prior Publication Data
US 2017/0235185 A1 Aug. 17, 2017

(30) Foreign Application Priority Data
Nov. 4, 2015 (CN) .......................... 2015 1 0742002

(51) Int. Cl.
*G02F 1/1333* (2006.01)
*G02F 1/1335* (2006.01)
*G02F 1/1368* (2006.01)
*G02F 1/1362* (2006.01)

(52) U.S. Cl.
CPC ...... *G02F 1/133514* (2013.01); *G02F 1/1368* (2013.01); *G02F 1/133528* (2013.01); *G02F 2001/133531* (2013.01); *G02F 2001/136222* (2013.01); *G02F 2201/08* (2013.01)

(58) Field of Classification Search
CPC ......... G02F 1/133514; G02F 1/133528; G02F 1/1368; G02F 2001/136222
See application file for complete search history.

(56) References Cited

U.S. PATENT DOCUMENTS

| 4,877,309 | A | * | 10/1989 | Takamatsu | ........ | G02F 1/133514 349/80 |
| 2005/0275780 | A1 | * | 12/2005 | Hisatake | ........... | G02F 1/133632 349/120 |
| 2009/0168001 | A1 | * | 7/2009 | Ichihashi | ............ | G02F 1/13363 349/119 |
| 2014/0285753 | A1 | * | 9/2014 | Nagato | ............. | G02F 1/133514 349/96 |

* cited by examiner

*Primary Examiner* — James Dudek
(74) *Attorney, Agent, or Firm* — Ladas & Parry LLP

(57) ABSTRACT

A liquid crystal panel and a liquid crystal display are disclosed. Stray backlights which are irradiated into areas of gate electrode circuits are absorbed by adding an anisotropic absorbing material into a mixture for forming a color filter layer and then controlling orientation of the anisotropic absorbing material to reduce the stray backlights entering into the gate electrode circuits, so that a better shading effect for the gate electrode circuits is provided.

20 Claims, 2 Drawing Sheets

LIQUID CRYSTAL PANEL AND LIQUID CRYSTAL DISPLAY

BACKGROUND OF THE INVENTION

1. Field of the Invention

The present invention relates to a liquid crystal panel and a liquid crystal display (LCD), and more specifically to a color-filter-on-array (COA) type liquid crystal panel and an LCD including the COA type liquid crystal panel.

2. Description of the Prior Art

A COA type LCD is an LCD having a color filter (CF) and thin film transistor (TFT) arrays disposed on the same substrate. In addition to an aperture ratio being effectively improved, the COA type LCD further can solve an alignment problem which occurs in a large-sized panel, as well as decreases current leakage being generated from a light exposure; and thus COA technology is applicable to a display of the large-sized panel.

The TFT arrays are used as a driving element. Existing TFT technology mainly uses amorphous silicon (a-Si) and poly-silicon (poly-Si). A Poly-silicon TFT is chiefly characterized by a high electron mobility, a smaller device size, and a large aperture ratio, thereby significantly improving image resolution. However, a low temperature poly-silicon (LTPS) process is quite complex, and is characterized by high manufacturing costs, low yield, and poor uniformity. In comparison with the Poly-silicon TFT, an amorphous silicon TFT is characterized by a low electron mobility, a larger TFT device size, and a smaller aperture ratio of a pixel. However, amorphous silicon manufacturing techniques have made great advances. The amorphous silicon manufacturing techniques are obviously better than poly-silicon manufacturing techniques in terms of manufacturing cost and large-area deposition uniformity.

However, the properties of the amorphous silicon itself result in that it is sensitive to light. Although there are many considerations in design to avoid a TFT being irradiated by a light (e.g., black matrix, bottom gate structure, and the like), the degradation of device characteristics which is caused by photoirradiation may occur unavoidably in practical application (e.g., the degradation of device characteristics which is caused by stray backlights entering into gate electrode circuits of the TFT arrays), thereby affecting the display quality of liquid crystal display.

Therefore, there is a need to provide a liquid crystal panel and a liquid crystal display which can reduce the stray backlights entering into the gate electrode circuits of the TFT arrays, so as to overcome the disadvantage in the prior art.

SUMMARY OF THE INVENTION

An object of the present invention is to provide a liquid crystal panel and a liquid crystal display. Stray backlights which are irradiated into areas of gate electrode circuits are absorbed by adding an anisotropic absorbing material into a mixture for forming a color filter layer and then controlling orientation of the anisotropic absorbing material to reduce the stray backlights entering into the gate electrode circuits, thereby providing a better shading effect for the gate electrode circuits.

To achieve the above object, the present invention provides a liquid crystal panel including:
a first substrate having a first polarizing layer, the first polarizing layer having a first polarizing absorption axis, the first substrate including:

a transparent substrate;
a TFT array layer disposed on the transparent substrate, the TFT array layer including a plurality of gate electrode circuits; and
a color filter layer disposed on the TFT array layer, the color filter layer made of a color resist material containing an anisotropic absorbing material;
a second substrate having a second polarizing layer, the second polarizing layer having a second polarizing absorption axis, the first substrate and the second substrate being correspondingly arranged and opposite each other; and
a liquid crystal layer sandwiched between the first substrate and the second substrate.

Areas corresponding to the gate electrode circuits in the color filter layer have a third polarizing absorption axis. The direction of the first polarizing absorption axis is different from the direction of the third polarizing absorption axis.

In one exemplary embodiment of the present invention, there is an angle between the first polarizing absorption axis and the third polarizing absorption axis, and the angle is between 45 and 135 degrees.

In one exemplary embodiment of the present invention, the angle is 90 degrees.

In one exemplary embodiment of the present invention, the anisotropic absorbing material includes an anisotropic metal nanoparticle, a carbon nanotube, or a dichroic dye.

In one exemplary embodiment of the present invention, the anisotropic absorbing material includes an anisotropic absorbing material having an anisotropic absorptivity for the total wavelength range of visible light.

In one exemplary embodiment of the present invention, the first polarizing layer is disposed on the lower surface of the transparent substrate or the TFT array layer.

In one exemplary embodiment of the present invention, remaining areas in the color filter layer have a fourth polarizing absorption axis, and the direction of the first polarizing absorption axis is the same as the direction of the fourth polarizing absorption axis.

In one exemplary embodiment of the present invention, the direction of the first polarizing absorption axis is perpendicular to the direction of the second polarizing absorption axis.

In one exemplary embodiment of the present invention, the first polarizing layer and the second polarizing layer are linear polarizing layers.

In one exemplary embodiment of the present invention, the liquid crystal panel is a COA type liquid crystal panel.

Furthermore, the present invention further provides an LCD including:
a backlight module; and
the liquid crystal panel disposed on the backlight module.

The present invention has obvious advantages and beneficial effects over the prior art. The liquid crystal panel and the liquid crystal display of the present invention according to the above technical scheme have at least the following advantages and beneficial effects. Stray backlights which are irradiated into the areas of the gate electrode circuits are absorbed by adding the anisotropic absorbing material into a mixture for forming the color filter layer and then controlling orientation of the anisotropic absorbing material to reduce the stray backlights entering into the gate electrode circuits, so that a better shading effect for the gate electrode circuits is provided.

DETAILED DESCRIPTION OF THE PREFERRED EMBODIMENTS

Various preferred embodiments are now described with reference to the accompanying drawings. In the following description, for purposes of explanation, numerous specific details are set forth in order to provide a thorough understanding of a liquid crystal panel and a liquid crystal display, and its specific embodiment, structure, feature and functions.

Figure 1:
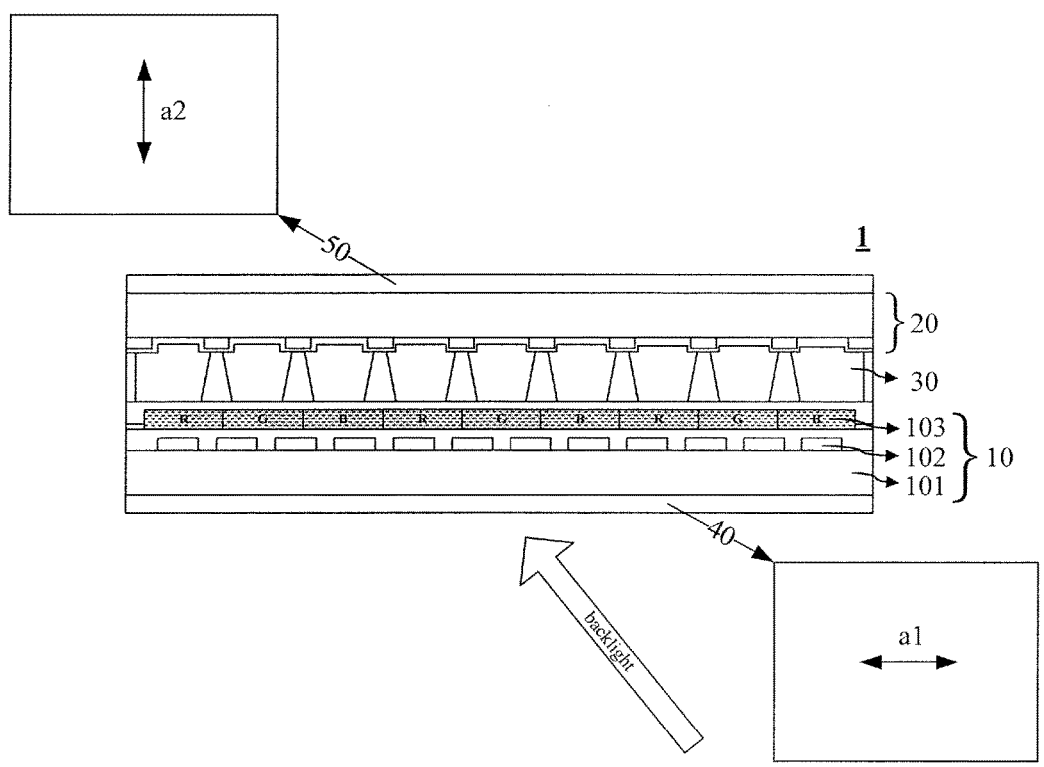
FIG. 1 is a schematic view of a structure of a liquid crystal panel according to one embodiment of the present invention.
Figure 2:
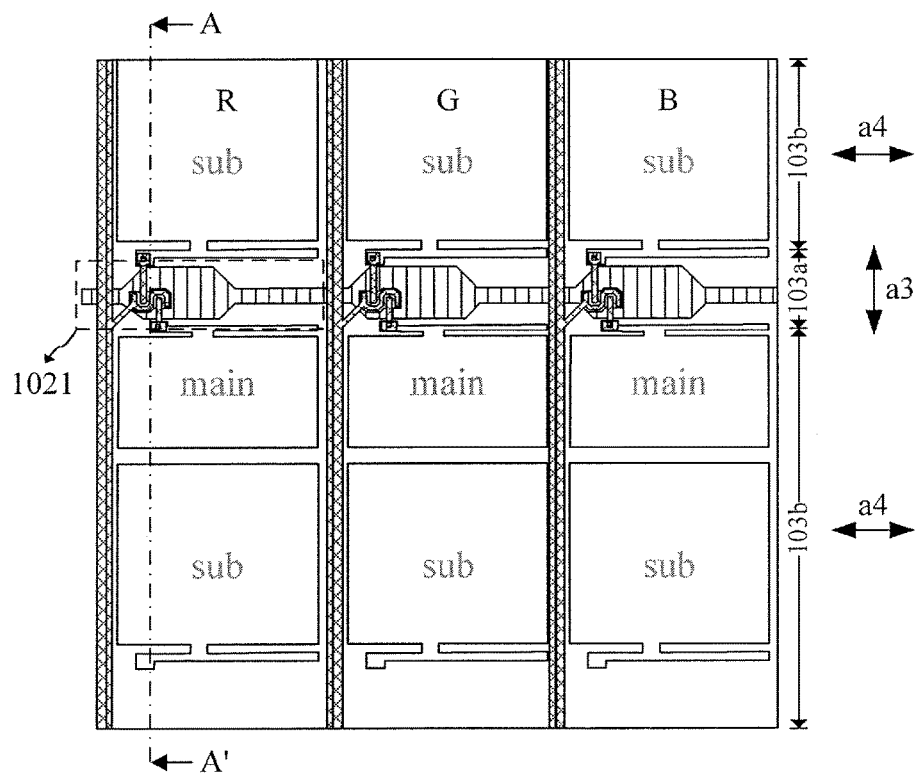
FIG. 2 is a partial enlarged top view of one area of the first substrate of FIG. 1.
Figure 3:
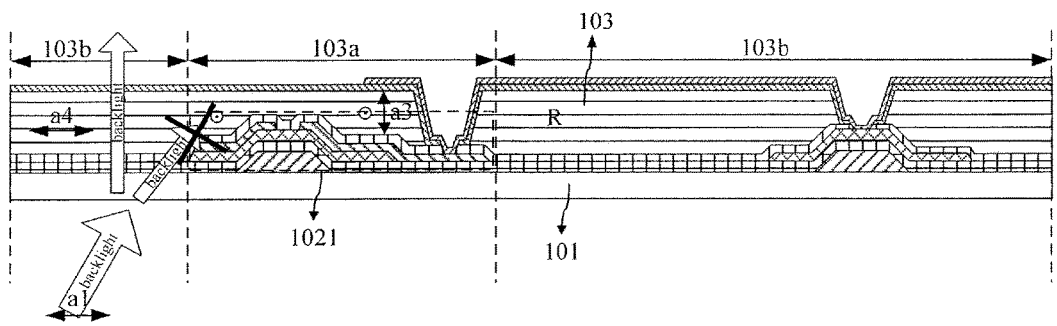
FIG. 3 is a profile view of a cross-section A-A' of FIG. 2.

Please refer to FIG. 1 to FIG. 3. FIG. 1 is a schematic view of a structure of a liquid crystal panel 1 according to one embodiment of the present invention, in which the lower right figure is a top view of a first polarizing layer 40, and the upper left figure is a top view of a second polarizing layer 50. FIG. 2 is a partial enlarged top view of one area of the first substrate 10 of FIG. 1, in which the right side thereof represents the directions of polarizing absorption axes corresponding to different areas in a color filter layer 103. FIG. 3 is a profile view of a cross-section A-A' of FIG. 2. The liquid crystal panel 1 is a COA type liquid crystal panel. The bottom of the liquid crystal panel 1 includes a backlight module (not shown in the figures) to construct an LCD.

The liquid crystal panel 1 includes a first substrate 10, a second substrate 20, and a liquid crystal layer 30. The first substrate 10 and the second substrate 20 are correspondingly arranged and opposite each other. The liquid crystal layer 30 is sandwiched between the first substrate 10 and the second substrate 20.

A first polarizing layer 40 is disposed on the lower surface of the first substrate 10. The first polarizing layer 40 has a first polarizing absorption axis a1. A second polarizing layer 50 is disposed on the upper surface of the second substrate 20. The second polarizing layer 50 has a second polarizing absorption axis a2. The first polarizing layer 40 and the second polarizing layer 50 both are linear polarizing layers. The direction of the first polarizing absorption axis a1 is perpendicular to the direction of the second polarizing absorption axis a2.

The first substrate 10 includes a transparent substrate 101, a thin film transistor (ITT) array layer 102, and a color filter layer 103. The TFT array layer 102 is disposed on the transparent substrate 101. The color filter layer 103 is disposed on the TFT array layer 102. The TFT array layer 102 includes a plurality of gate electrode circuits 1021.

Areas 103a corresponding to the gate electrode circuits 1021 in the color filter layer 103 have a third polarizing absorption axis a3. The angle of the first polarizing absorption axis a1 and the third polarizing absorption axis a3 is between 45 and 135 degrees. Preferably, the angle of the first polarizing absorption axis a1 and the third polarizing absorption axis a3 is 90 degrees, as shown in FIGS. 1-2. Remaining areas 103b (i.e., transparent areas) in the color filter layer 103 have a fourth polarizing absorption axis a4. The direction of the first polarizing absorption axis a1 is the same as the direction of the fourth polarizing absorption axis a4.

Herewith, when light produced by the backlight module is irradiated onto the liquid crystal panel 1 (please refer to FIG. 3), the light is first passed through the first polarizing layer 40, output light obtained by passing through the first polarizing layer 40 has a polarizing direction perpendicular to the first polarizing absorption axis a1 at that moment. The output light is absorbed by an anisotropic absorbing material having an absorbing axis corresponding to the output light when the output light is scattered into the areas 103a in the color filter layer 103. However, when the output light is passed through the remaining areas 103b in the color filter layer 103, the output light can be passed through the remaining areas 103b at almost no loss since the polarizing direction of the output light is perpendicular to the absorbing axis of the anisotropic absorbing material of the remaining areas 103b.

As mentioned above, since the first polarizing absorption axis a1 of the first polarizing layer 40 is perpendicular to the third polarizing absorption axis a3 of the areas 103a in the color filter layer 103 and is parallel to the fourth polarizing absorption axis a4 of the remaining areas 103b in the color filter layer 103, and therefore when the light produced by the backlight module is irradiated onto the liquid crystal panel 1, in addition to being able to absorb stray backlights by the areas 103a in the color filter layer 103, the present invention may not affect the light transmittance of the remaining areas 103b in the color filter layer 103.

The color filter layer 103 is made of a color resist material containing an anisotropic absorbing material. As with a liquid crystal molecule, the anisotropic absorbing material has an asymmetric structure, has a predetermined orientation, and has a light absorbing ability depend on the variation of a direction in which the light is incident. The anisotropic absorbing material includes an anisotropic metal nanoparticle, a carbon nanotube, or a dichroic dye. The anisotropic absorbing material includes an anisotropic absorbing material having an anisotropic absorptivity for the total wavelength ranges of visible light (i.e., an anisotropic absorbing material having an anisotropic absorptivity to all wavelength ranges of visible light). The orientation of the anisotropic absorbing material in the areas 103a or the areas 103b of the color filter layer 103 of the present invention can be performed by the following method, thereby controlling absorbing axes of the anisotropic absorbing materials in the different areas.

In one embodiment of the present invention, a liquid crystal polymer or analog thereof can be used in order to effectively disperse, orient, and fix the anisotropic absorbing material. The liquid crystal polymer is oriented by an electric field, and the anisotropic absorbing material can be easily dispersed and oriented by such feature. A reactive liquid crystal monomer or oligomer containing an ultraviolet (UV) curing reactive group and the anisotropic absorbing material are mixed, and the mixture is dispersed and then oriented in the electric field. The obtained mixture can be irradiated by a UV light, thereby forming a liquid crystal polymer having a fixed orientation. Preferably, the orientation of liquid crystals is controlled along a direction which is the same as the direction of the an isotropic absorbing material.

In another embodiment of the present invention, the color filter layer 103 includes an anisotropic absorbing material and a resin. After a mixture for forming the color filter layer 103 is coated, there is an electric field applied to thereon, thereby controlling the orientation of the anisotropic absorbing material. That is irradiated by a UV light in this state to cure the resin and fix the state of the orientation, thereby obtaining the color filter layer 103.

In a further embodiment of the present invention, the color filter layer 103 includes an anisotropic absorbing material, a liquid crystal polymer, and a resin. After the anisotropic absorbing material and a liquid crystal molecule are mixed and dispersed, the obtained mixture and a UV curing resin are mixed. Then, a mixture containing the anisotropic absorbing material, the liquid crystal molecule, and the UV curing resin is phase-separated. Then, the orientation of the liquid crystal molecule and the dispersed anisotropic absorbing material can be controlled by an electric field, as well as being irradiated by a UV light to be cured. The UV curing resin and liquid crystals/the anisotropic absorbing material have a proper proportion, thereby they can be phase-separated, and thus a fine spherical particle (guest-host sphere) is formed. The temperature thereof can also be adjusted in accordance with requirements. However, the present invention is not limited thereto.

As mentioned above, in the liquid crystal panel 1 and the liquid crystal display of the present invention, the stray backlights which are irradiated into the areas of the gate electrode circuits 1021 are absorbed by adding the anisotropic absorbing material into the mixture for forming the color filter layer 103 and then controlling orientation of the anisotropic absorbing material to reduce the stray backlights entering into the gate electrode circuits 1021, so that a better shading effect for the gate electrode circuits 1021 is provided.

The above description of the invention is intended to be illustrative and not limiting. Various changes or modifications in the embodiments described may occur to those skilled in the art. These can be achieved without departing from the spirit or scope of the invention.

What is claimed is:

1. A liquid crystal panel, comprising:
   a first substrate having a first polarizing layer, the first polarizing layer having a first polarizing absorption axis, the first substrate comprising:
   a transparent substrate;
   a thin film transistor (TFT) array layer disposed on the transparent substrate, the TFT array layer comprising a plurality of gate electrode circuits; and
   a color filter layer disposed on the TFT array layer, the color filter layer made of a color resist material containing an anisotropic absorbing material, the anisotropic absorbing material comprising an anisotropic metal nanoparticle, a carbon nanotube, or a dichroic dye,
   wherein the first polarizing layer is disposed on a lower surface of the transparent substrate or the TFT array layer;
   a second substrate having a second polarizing layer, the second polarizing layer having a second polarizing absorption axis, the first substrate and the second substrate being correspondingly arranged and opposite each other; and
   a liquid crystal layer sandwiched between the first substrate and the second substrate,
   wherein areas corresponding to the gate electrode circuits in the color filter layer have a third polarizing absorption axis, and a direction of the first polarizing absorption axis is different from a direction of the third polarizing absorption axis, there is an angle between the first polarizing absorption axis and the third polarizing absorption axis, and the angle is between 45 and 135 degrees.

2. The liquid crystal panel of claim 1, wherein the angle is 90 degrees.

3. The liquid crystal panel of claim 1, wherein remaining areas in the color filter layer have a fourth polarizing absorption axis, and the direction of the first polarizing absorption axis is the same as a direction of the fourth polarizing absorption axis.

4. The liquid crystal panel of claim 1, wherein the direction of the first polarizing absorption axis is perpendicular to a direction of the second polarizing absorption axis.

5. A liquid crystal panel, comprising:
   a first substrate having a first polarizing layer, the first polarizing layer having a first polarizing absorption axis, the first substrate comprising:
   a transparent substrate;
   a thin film transistor (TFT) array layer disposed on the transparent substrate, the TFT array layer comprising a plurality of gate electrode circuits; and
   a color filter layer disposed on the TFT array layer, the color filter layer made of a color resist material containing an anisotropic absorbing material;
   a second substrate having a second polarizing layer, the second polarizing layer having a second polarizing absorption axis, the first substrate and the second substrate being correspondingly arranged and opposite each other; and
   a liquid crystal layer sandwiched between the first substrate and the second substrate,
   wherein areas corresponding to the gate electrode circuits in the color filter layer have a third polarizing absorption axis, and a direction of the first polarizing absorption axis is different from a direction of the third polarizing absorption axis.

6. The liquid crystal panel of claim 5, wherein there is an angle between the first polarizing absorption axis and the third polarizing absorption axis, and the angle is between 45 and 135 degrees.

7. The liquid crystal panel of claim 6, wherein the angle is 90 degrees.

8. The liquid crystal panel of claim 5, wherein the anisotropic absorbing material comprises an anisotropic metal nanoparticle, a carbon nanotube, or a dichroic dye.

9. The liquid crystal panel of claim 5, wherein the first polarizing layer is disposed on a lower surface of the transparent substrate or the TFT array layer.

10. The liquid crystal panel of claim 5, wherein remaining areas in the color filter layer have a fourth polarizing absorption axis, and the direction of the first polarizing absorption axis is the same as a direction of the fourth polarizing absorption axis.

11. The liquid crystal panel of claim 5, wherein the direction of the first polarizing absorption axis is perpendicular to a direction of the second polarizing absorption axis.

12. The liquid crystal panel of claim 5, wherein the first polarizing layer and the second polarizing layer are linear polarizing layers.

13. A liquid crystal display, comprising:
    a backlight module; and
    a liquid crystal panel disposed on the backlight module, the liquid crystal panel comprising:
    a first substrate having a first polarizing layer, the first polarizing layer having a first polarizing absorption axis, the first substrate comprising:
    a transparent substrate;
    a thin film transistor (TFT) array layer disposed on the transparent substrate, the TFT array layer comprising a plurality of gate electrode circuits; and
    a color filter layer disposed on the TFT array layer, the color filter layer made of a color resist material containing an anisotropic absorbing material;

a second substrate having a second polarizing layer, the second polarizing layer having a second polarizing absorption axis, the first substrate and the second substrate being correspondingly arranged and opposite each other; and a liquid crystal layer sandwiched between the first substrate and the second substrate, wherein areas corresponding to the gate electrode circuits in the color filter layer have a third polarizing absorption axis, and a direction of the first polarizing absorption axis is different from a direction of the third polarizing absorption axis.

14. The liquid crystal display of claim 13, wherein there is an angle between the first polarizing absorption axis and the third polarizing absorption axis, and the angle is between 45 and 135 degrees.

15. The liquid crystal display of claim 14, wherein the angle is 90 degrees.

16. The liquid crystal display of claim 13, wherein the anisotropic absorbing material comprises an anisotropic metal nanoparticle, a carbon nanotube, or a dichroic dye.

17. The liquid crystal display of claim 13, wherein the first polarizing layer is disposed on a lower surface of the transparent substrate or the TFT array layer.

18. The liquid crystal display of claim 13, wherein remaining areas in the color filter layer have a fourth polarizing absorption axis, and the direction of the first polarizing absorption axis is the same as a direction of the fourth polarizing absorption axis.

19. The liquid crystal display of claim 13, wherein the direction of the first polarizing absorption axis is perpendicular to a direction of the second polarizing absorption axis.

20. The liquid crystal display of claim 13, wherein the first polarizing layer and the second polarizing layer are linear polarizing layers.

\* \* \* \* \*